(12) United States Patent
Lim et al.

(10) Patent No.: US 7,978,174 B2
(45) Date of Patent: Jul. 12, 2011

(54) SYSTEM AND METHOD FOR INTERACTIVE THREE-DIMENSIONAL POSITION TRACKING

(75) Inventors: Soo Sean Lim, Ipoh Perak (MY); Shalini Venkatesh, Santa Clara, CA (US); Lye Hock Bernard Chan, Penang (MY); Tong Sen Liew, Perak (MY); Nobutaka Itagaki, Tokyo (JP)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1207 days.

(21) Appl. No.: 11/449,263

(22) Filed: Jun. 7, 2006

(65) Prior Publication Data
US 2007/0285386 A1    Dec. 13, 2007

(51) Int. Cl.
G06F 3/033 (2006.01)
G06F 3/041 (2006.01)
G06F 17/00 (2006.01)
(52) U.S. Cl. .................. 345/157; 178/18.01; 463/30
(58) Field of Classification Search .......... 345/156–184; 463/30–47.2
See application file for complete search history.

(56) References Cited

U.S. PATENT DOCUMENTS

| 6,123,264 A * | 9/2000 | Li et al. .................... 235/472.01 |
| 2002/0107069 A1* | 8/2002 | Ishino .............................. 463/30 |
| 2005/0059488 A1* | 3/2005 | Larsen et al. ................... 463/36 |
| 2005/0270494 A1* | 12/2005 | Banning ......................... 353/42 |

FOREIGN PATENT DOCUMENTS

JP    10198506    7/1998
JP    2002/351603   12/2002

* cited by examiner

*Primary Examiner* — Bipin Shalwala
*Assistant Examiner* — Sosina Abebe

(57) ABSTRACT

A system and method for tracking the x, y and z coordinates of a position of an input device in an interactive computer system is disclosed. An image sensor situated on the input device captures images of an electronic marker displayed on a display screen. As the position of the input device changes, the features of the electronic marker as captured by the image sensor also change. Images of the electronic marker captured during game play are compared to a calibration image of the electronic marker to determine current x, y and z coordinates of positions of the input device. The game display is updated to reflect the movements of the input device.

20 Claims, 5 Drawing Sheets

SYSTEM AND METHOD FOR INTERACTIVE THREE-DIMENSIONAL POSITION TRACKING

FIELD OF THE INVENTION

Embodiments of the present invention pertain generally to the field of interactive computer systems. More specifically, embodiments of the present invention pertain to position tracking of a user input device for a computer system.

BACKGROUND OF THE INVENTION

Many interactive computer systems available today utilize an input device held or otherwise manipulated by the user(s) to interact with the characters and/or landscape of a computer program, e.g. a game. For example, a conventional video game allows a user to hold a "gun" and "shoot" at clay pigeons on a display screen. The gun is connected with the game controller, either by a cord or by wireless link. The x-y position of the gun at the time the trigger is pulled is assessed by flashing an electronic marker across the screen. The image of the electronic marker is captured by a sensor on the input device, and the appearance of the captured image is used to assess the x-y position of the gun at the time the trigger was pulled. In this fashion, conventional interactive systems permit two-dimensional tracking of a user input device.

Two-dimensional tracking provides for limited interaction for the user with elements of a computer program, e.g. a game. For example, the previously mentioned game where a user can take aim and shoot at clay pigeons as they travel across a display screen. However, conventional systems do not track the movement of an input device as a user moves forward or backward in relation to a display screen. In conventional systems, the distance of the user from the display screen does not factor in to the interactive nature of the game.

Typically, the sensor is a photodiode. In conventional systems, the flashing of the electronic marker briefly interrupts the program (e.g. the game) and is typically detectable by the user. This interruption may be an annoying distraction to the enjoyment of the program or game. For example, in some systems, the whole screen may flash white for a time period that is detectable by the user.

SUMMARY OF THE INVENTION

Embodiments of the present invention, a method and system for x, y, and z tracking for an interactive electronic computer system, using an electronic marker on a display screen and an image sensor on an input device, are disclosed. Initially, a calibration position having x, y and z coordinates is established. A first series of program frames is then displayed on the display screen, depicting a view of a program from the calibration position. The electronic marker is then flashed on the display screen. The image of the electronic marker is captured by the image sensor, and the location of the electronic marker at the image sensor is used to calculate a relative position of the input device. The relative position also has x, y and z coordinates. A second series of program frames is then displayed at the display screen depicting a view of the program from the relative position.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Figure 1:
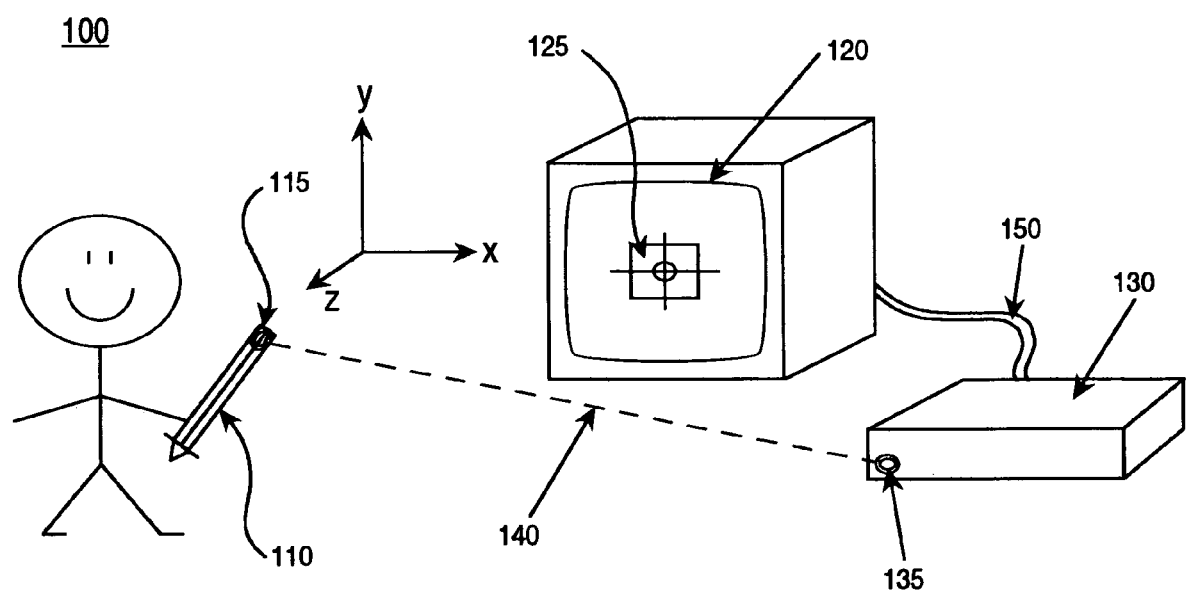
FIG. 1 is an illustration of an interactive computer system in accordance with embodiments of the present invention.

FIG. 1 depicts a computer system in accordance with embodiments of the present invention. The system depicted in FIG. 1 is an interactive electronic game system. In the embodiment illustrated in FIG. 1, a user holds an input device 110 that includes an image sensor 115. In this example, the input device 110 is a sword, but the input device 110 could be any shape or size, corresponding to different games played on the game system 100. In other embodiments, the input device may be a remote controlled device or another device not physically held by a user. The game system 100 of FIG. 1 includes a controller 130 and a display screen 120. The controller 130 and the display screen 120 are connected in FIG. 1 by a cord 150, but a wireless connection or other known connection could also be employed.

When an electronic marker 125 is displayed on the display screen 120 in system 100, the image of the electronic marker 125 is captured by the image sensor 115 on the input device 110. In one embodiment of the present invention, the image sensor 115 is an optical position displacement sensor. After it is captured at the image sensor 115, the captured image of the electronic marker is transmitted to a receiver 135 on the controller 130. In FIG. 1, the input device 110 and the controller 130 are connected via a wireless connection 140, however a cord or other means of transmission could be employed. The appearance of the electronic marker 125 at the time the image is captured conveys information that is used by the controller to calculate x, y and z coordinates of a position of the input device 110.

Figure 2A:
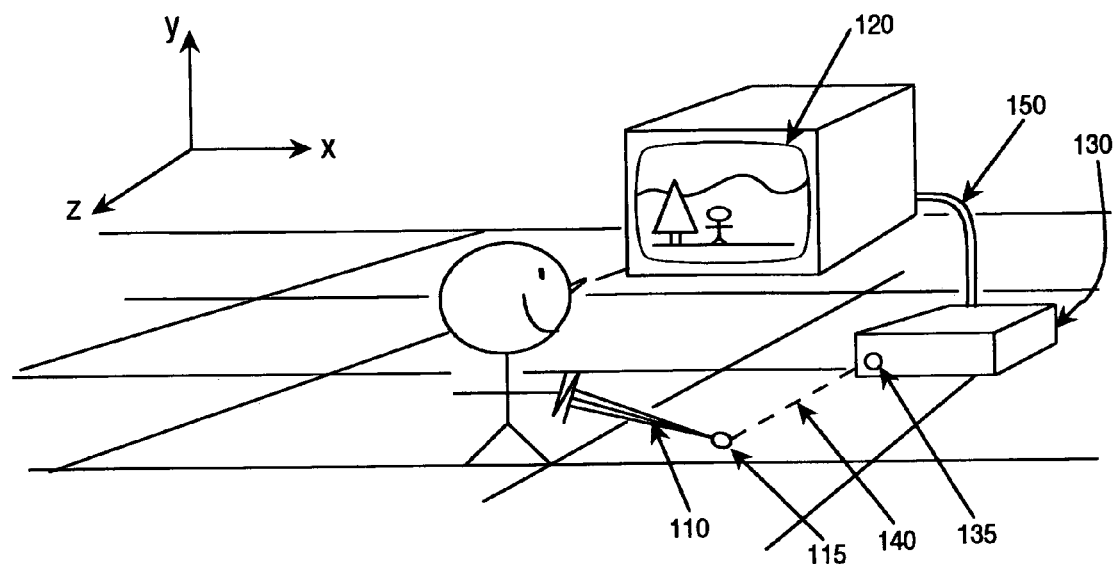
FIGS. 2A and 2B further illustrate an interactive computer system in accordance of embodiments of the present invention.
Figure 2B:
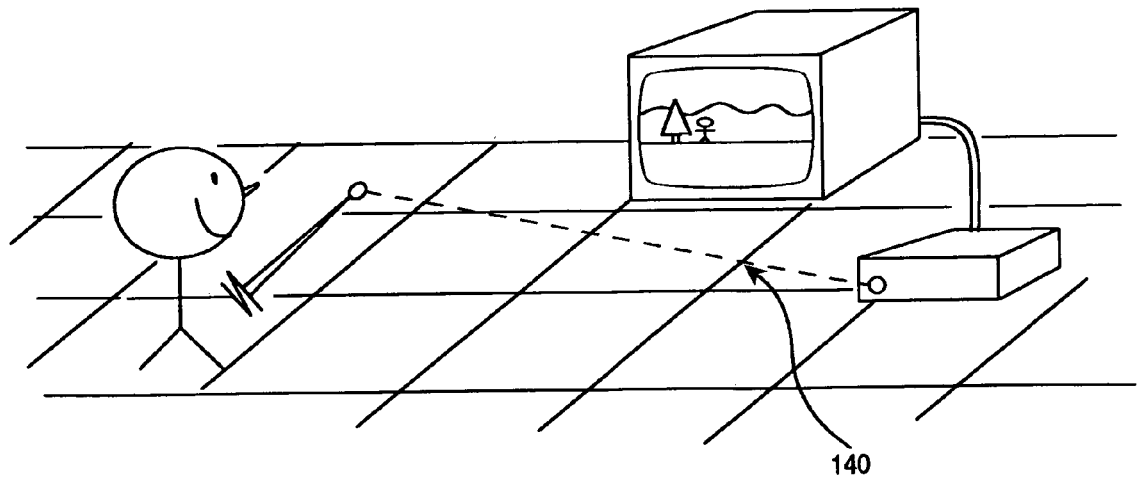

For example, FIGS. 2A and 2B depict one embodiment of the present invention. The game system 100 in FIGS. 2A and 2B is being used to play a fencing game. A user holds the input device 110, which is shaped like a sword in this embodiment. As the user interacts with his combatants on the display screen 120, he physically moves around in the region in front of the display screen 120. He is at times close to the screen 120, far from the screen 120, to the right of the screen 120, and to the left of the screen 120. All of these movements are tracked and incorporated into the game experience.

FIGS. 2A and 2B depict the interactive nature of the game system 100. As the user moves the input device 110 around in the space in front of the display screen 120, the point of view of the game evolves. For example, in FIG. 2B, the position of the input device is further back, to the left of and higher than the position of the input device in FIG. 2A. The display screen in FIG. 2B reflects the change in position of the input device 110, e.g. the features of the landscape appear further away in FIG. 2B than in FIG. 2A. The x, y and z coordinates of the position of the input device 110 are tracked to provide three-dimensional interaction between the user and the game.

Referring back to FIG. 1, the location of the captured image of the electronic marker 125 on the image sensor 115 at the time the image of the electronic marker 125 is captured by the image sensor 115 is used to calculate the absolute position of the input device 110. The absolute position is calculated at the outset of the game to establish a calibration position, as well as whenever during the game a reference is needed. Subsequent to the calculation of an absolute position, images of the electronic marker 125 captured by the image sensor 115 are used to calculate relative positions based on the absolute position by using cross-correlation. In one embodiment of the present invention, the electronic marker 125 is flashed to establish a reference position at predetermined intervals throughout the duration of the game. In another embodiment, the electronic marker 125 is flashed to establish absolute position only as needed, at times determined by game play.

The electronic marker 125 is a pattern generated by the game controller 130 and shown on the display screen 120. In one embodiment, the electronic marker 125 occupies a small part of the screen to avoid distracting the user, and is displayed continuously. In another embodiment, the electronic marker 125 is displayed over a large part of the display screen, but only intermittently, so as to avoid distracting the user.

In one embodiment, the pattern of the electronic marker 125 is a row of alternating black and white squares. In other embodiments, other patterns are employed. The position of the input device 110 is calculated relative to the display screen 120. In this way, the game allows the user to perceive the game (e.g. the landscape, other combatants, etc.) as if he is actually moving around in three dimensions within the game.

Features of the pattern of the electronic marker 125 directly provide reference x and y coordinates to calibrate the position of the image captured by the image sensor 115. In one embodiment of the present invention, the image sensor 115 is a navigation sensor of the "flying mouse" type, for example an optical position displacement sensor. The image sensor 115 is positioned on the input device 110 such that the image sensor 115 faces the display screen 120 as much as possible during typical game play. The separation of features of the pattern of the electronic marker 125 provides a relative z-axis reference. For example, the further apart the features of the pattern appear in the image of the electronic marker 125 captured by the image sensor 115, the closer the input device 115 must be to the display screen 120. Alternately, the closer the features of the pattern appear in the image of the electronic marker 125 captured by the image sensor 115, the further the input device 115 must be to the display screen 120.

The display screen 120 can be any type of display screen capable of displaying the video portion of an interactive electronic game. In one embodiment, the display screen 120 is a computer monitor. In another embodiment, the display screen 120 is a video arcade game screen. In still another embodiment, the display screen 120 is a cathode ray tube (CRT). In the CRT embodiment, a synchronization signal is generated by the game controller 130 to initiate image capture at the appropriate time to view the pattern information.

Figure 3:
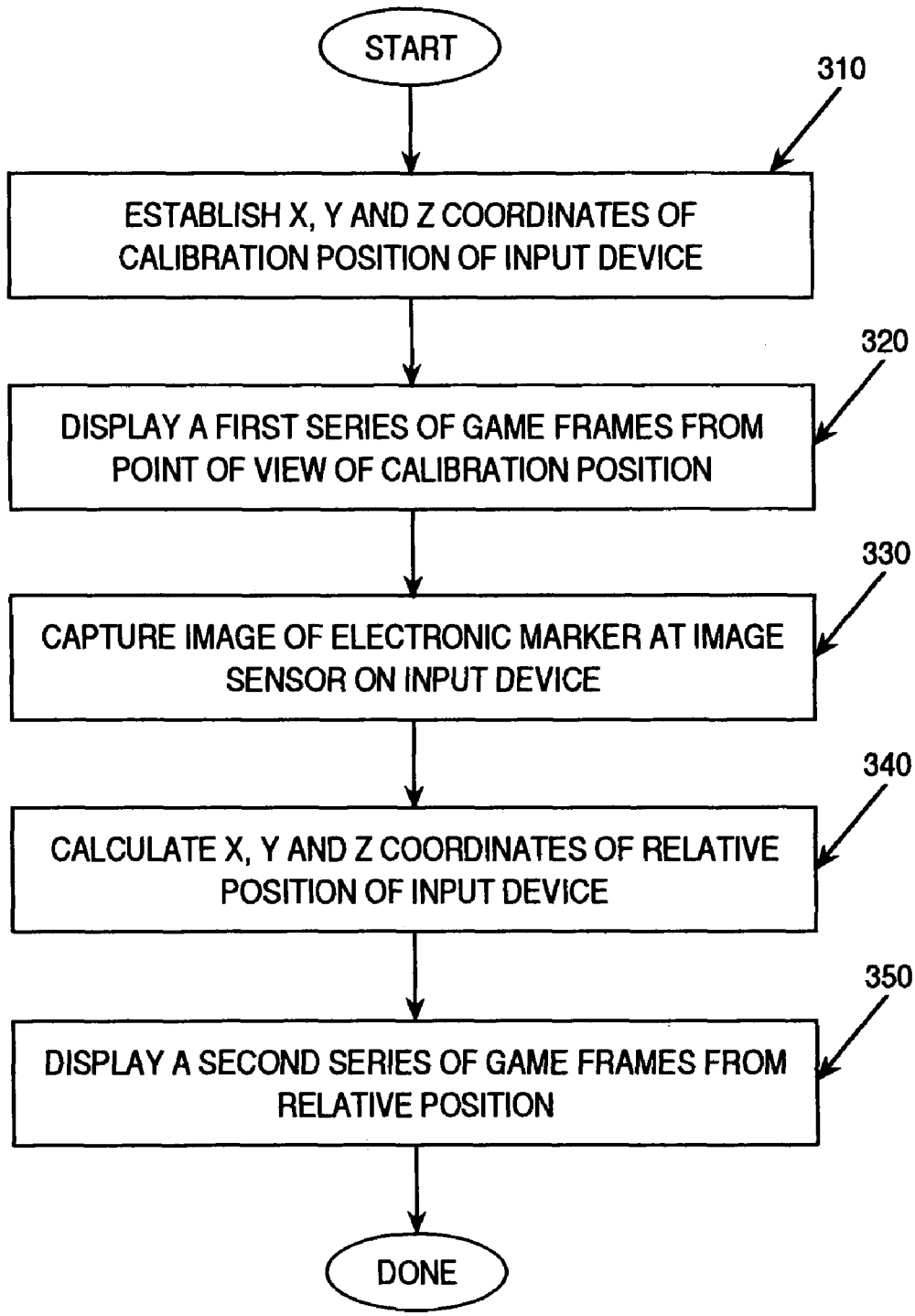
FIG. 3 is a flowchart depicting steps in a method of tracking the position of an input device in an interactive computer system in accordance with embodiments of the present invention.

In a preferred embodiment, the game system 100 tracks the x, y and relative z position of the input device 110 by the method depicted in flowchart 300 of FIG. 3. Initially, as step 310 indicates, a calibration position is established for the input device 110. The calibration position is established at the outset of game play, and as needed throughout game play, by capturing an image of the electronic marker 125 at the image sensor 115. In one embodiment, this calibration display of the electronic marker 125 consists of a flash before game controller 130 begins sending the frames of the video game to the display screen 120. In one embodiment, the flash of the electronic marker 125 is not user detectable. In other embodiments, the electronic marker 125 may be constantly displayed in a region of the display screen 120, e.g. a row of black and white alternating squares along the top, bottom or a side of the display screen 120.

The appearance of the image of the calibration display of the electronic marker 125 as captured at the image sensor 115, e.g. the location of the captured image on the image sensor 115, provides a reference image of the electronic marker 125. The calibration image of the electronic marker 125 is stored by the game controller 130. Once the calibration position has been established, a first series of frames of the video game is displayed on the display screen 120, as step 320 indicates. The first series of frames depicts the game from the point of view of the calibration position. In one embodiment, the first series of frames consists of 30 frames. In other embodiments, other numbers of frames of the game are displayed before a second image of the electronic marker is captured by the image sensor, as in step 330.

In one embodiment, the electronic marker 125 is displayed intermittently, e.g. the first series of game frames is followed by a flash of the electronic marker 125, followed by a second series of game frames (step 350). If the electronic marker 125 is intermittently displayed, the electronic marker 125 is displayed for a fraction of a second and is not detectable to a user. In other embodiments, the electronic marker is constantly displayed on a portion of the display screen 120, therefore there is no break between the first series of game frames (step 320) and the second series of game frames (step 350).

During game play, the electronic marker 125 is generated by the game controller 130 and reflects the current position of the input device 110. For example, referring to FIG. 4A, at the time of calibration, $t_0$, the image sensor 115 on the input device 110 is at the calibration position $p_0$. Position $p_0$ has coordinates $x_0$, $y_0$ and $z_0$. Position $p_0$ will be used to calculate subsequent relative positions of the image sensor on the input device 110, using cross correlation.

Figure 4A:
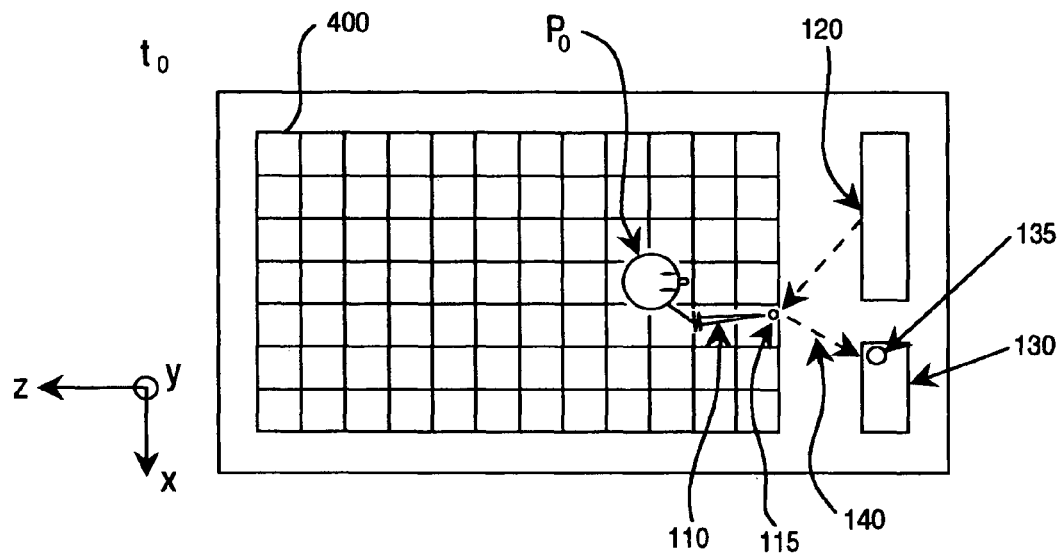
FIGS. 4A and 4B illustrate an overhead view of the interactive computer system of the present invention.

Referring back to flowchart 300 with FIG. 4A as an illustration, the first series of game frames (step 320 in FIG. 3) generated by the game controller 130 is shown on the display screen 120 depicting the game from position $p_0$. The electronic marker is displayed at the end of the first series of game frames (or during the first series of game frames), and reflects $p_0$.

Figure 4B:
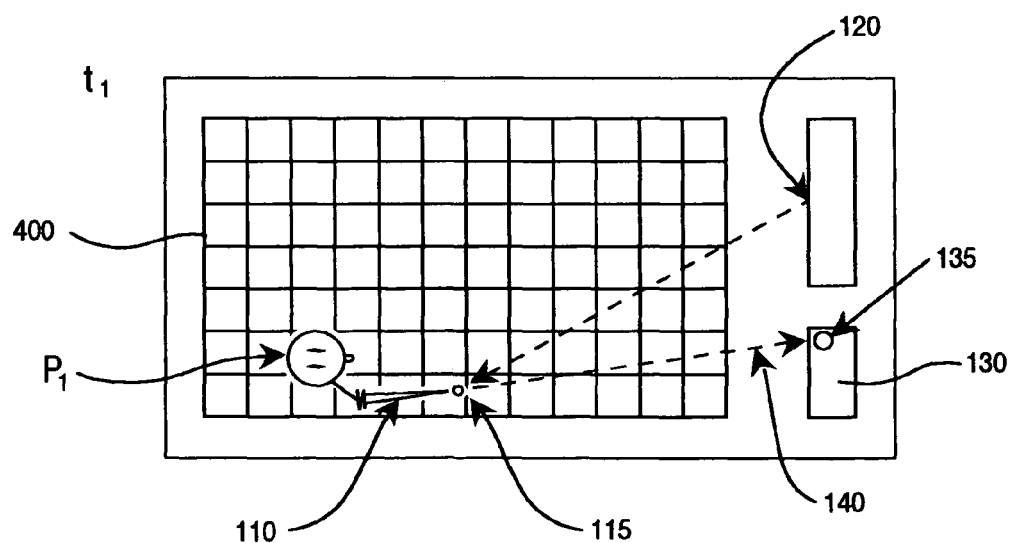

As step 330 in FIG. 3 indicates, after the first series of game frames, the electronic marker 125 is again captured by the image sensor 115. Referring to FIG. 4B, the second capture of the electronic marker 125 is performed at time $t_1$. If the user has changed the physical position of the input device 110 since $t_0$, the appearance of the captured electronic marker 125 from the point of view of the image sensor 115 will have changed. For example, as depicted in FIG. 4B, at time $t_1$, due to the movements of the user, the image sensor 115 on the input device 110 is at position $p_1$.

Features of the pattern of the electronic marker 125 captured at position $p_1$ are different from the features of the pattern as captured at position $p_0$. For example, as in FIG. 4B, if position $p_1$ is further away from the display screen 120 than the calibration position $p_0$, the features of the electronic marker 125 as captured at the image sensor 115 at time $t_1$ will be closer together. Alternately, if position $p_1$ is closer to the display screen 120 than the calibration position $p_0$, the features of the electronic marker 125 as captured at the image sensor 115 at time $t_1$ will be further apart.

The game controller 130 compares the appearance of the electronic marker captured at time $t_0$ with the appearance of the electronic marker captured at time $t_1$. Using cross-correlation, a first relative position of the input device 110 at time $t_1$ is calculated, as in step 340 in FIG. 3. The relative position, $p_1$ includes coordinates $x_1$, $y_1$ and $z_1$. The game controller then generates a new point of view for a second series of game frames. The second series of game frames depicts the game from the point of view of position $p_1$ (step 350, FIG. 3).

For the duration of game play, the electronic marker is captured either at predetermined intervals or as needed during game play. New relative positions of the image sensor 115 on the input device 110 are calculated and reflected on the display screen 120 in the frames of the video game. In a preferred embodiment, the capture of the electronic marker occurs often enough such that the user perceives the game as if he is actually moving around within the virtual environment of the game.

Figure 5:
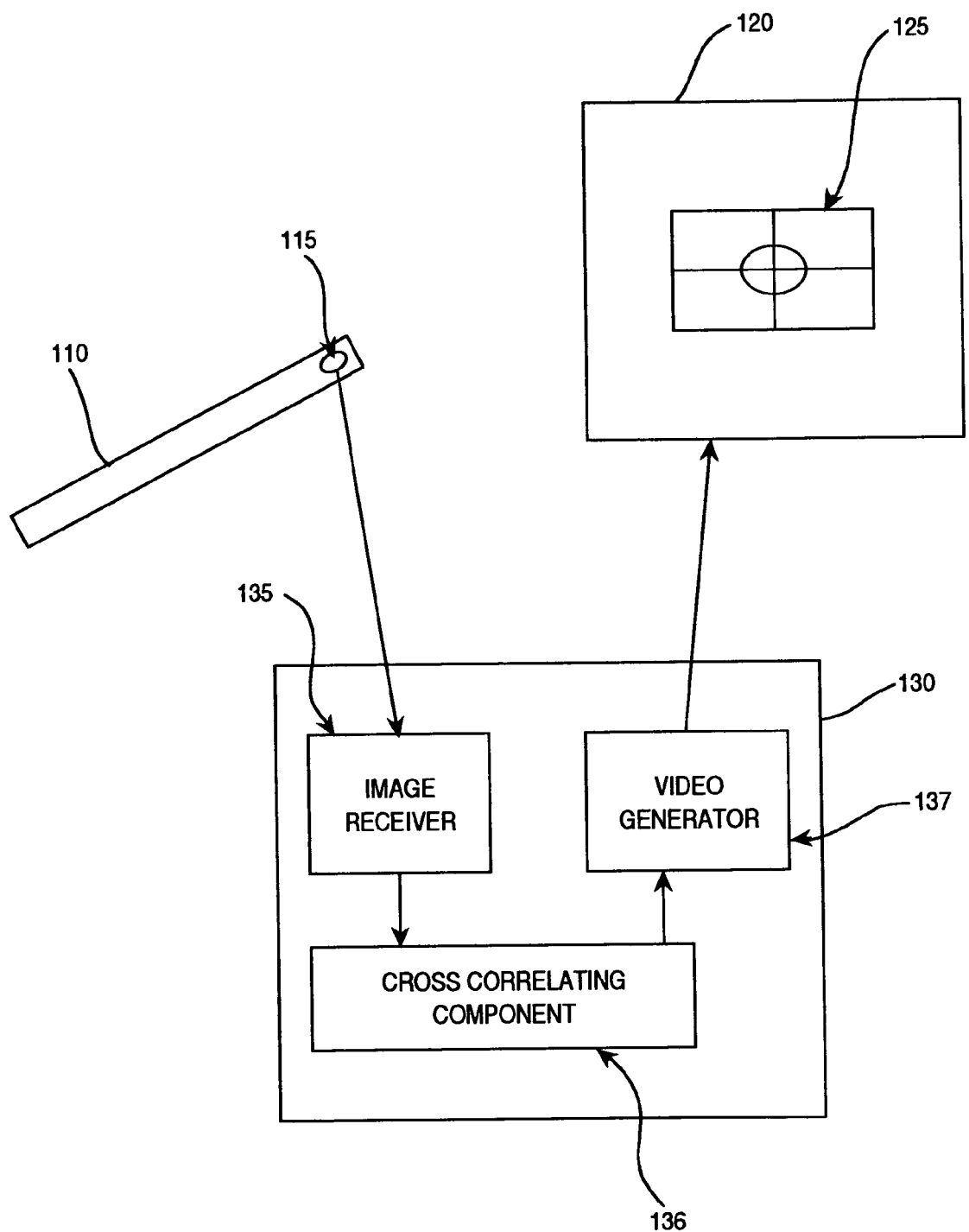
FIG. 5 is a block diagram of an interactive computer system according to the present invention.

FIG. 5 is a block diagram of the game system 100. As discussed above, the display screen 120 displays an image of the electronic marker 125, which is captured by an image sensor 115 on an input device 110. In a preferred embodiment the input device is held by a user who uses the input device to interact with the game. As the user plays the game, he physically moves around in a region (400 in FIGS. 4A and 4B), and he moves the input device up, down and around (see FIGS. 2A and 2B). In one embodiment, the input device is a weapon, e.g. a sword. The user moves his body and the input device 110 to interact with the environment and his combatants in the game.

Whenever an update in the position of the image sensor 115 on the input device 110 is desired, e.g. at regular intervals or after predetermined events in the game, an image of the electronic marker 125 is captured by the image sensor 115. This captured image is then communicated to the game controller 130. To facilitate this communication, the input device 110 is coupled with the game controller 130 by a communication link 140, e.g. a wireless connection.

The image captured by the image sensor 115 is received at an image receiver component 135 of the game controller. Data regarding this captured image is then used by a cross correlating component 136 within the game controller 130 to determine the x, y and z coordinates of the current position of the image sensor 115 on the input device 110. The current position of the image sensor 110 is then incorporated in to the game, and video generator 137 within the game controller 130 generates a new series of game frames reflecting the current position. The new series of game frames is communicated to the display screen 120 by means of a second communication link 150, e.g. a cord.

Although the preferred embodiment of the present invention is an electronic interactive game system, those of ordinary skill in the art will appreciate that the image of an electronic marker displayed on a display screen and captured at an image sensor can be used to track x, y and relative z positions for uses other than an electronic game system.

The foregoing description of specific embodiments of the present invention has been presented for purposes of illustration and description. They are not intended to be exhaustive or to limit the invention to the precise forms disclosed, and many modifications and variations are possible in light of the above teaching. The embodiments of were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of tracking a position of an input device for an interactive electronic system comprising:
    displaying an electronic marker on a display screen;
    capturing a calibration image of said electronic marker using an image sensor of the input device positioned at a calibration position with respect to said display screen;
    assigning calibration x, y and z coordinates based on an appearance of said electronic marker in said calibration image to establish said calibration position of said input device, including using a separation of features of said electronic marker in said calibration image to determine the distance between said input device and said display screen to assign said calibration z coordinate;
    displaying a first series of program frames on a display screen without displaying said electronic marker, wherein said first series of frames depict a view of a program from said calibration position;
    displaying said electronic marker on said display screen after said displaying of said first series of program frames on said display screen;
    capturing a first image of said electronic marker using said image sensor of said input device positioned at a first relative position with respect to said calibration position;
    calculating said first relative position of said input device comprising x, y and z coordinates using said first image of said electronic marker; and
    displaying a second series of program frames on said display screen without displaying said electronic marker, wherein said second series of frames depict a view of said program from said first relative position.

2. The method described in claim 1 wherein said calculating said first relative position is accomplished by comparing said first image with said calibration image using cross-correlation.

3. The method described in claim 1 wherein said image sensor is a navigation sensor.

4. The method described in claim 3 wherein said navigation sensor is a flying mouse.

5. The method described in claim 1 wherein said display screen is a television screen.

6. The method described in claim 1 wherein said display screen is a computer screen.

7. The method described in claim 1 wherein said display screen is a video arcade game monitor.

8. The method described in claim 1 wherein said first series of visual frames comprises 30 frames.

9. The method described in claim 1 wherein said displaying said electronic marker displaying said electronic marker for a fraction of a second so that said electronic marker is not user-detectable.

10. The method described in claim 1 wherein said electronic marker comprises a row of alternating black and white squares.

11. The method described in claim 1 wherein said program is a game.

12. An interactive electronic system comprising:
an input device comprising an image sensor, wherein a first image of an electronic marker flashed on a display screen and generated by a controller is captured by said image sensor, and wherein said first image is used to assess x, y and z coordinates of a calibration position of said input device with respect to said display screen, including using a separation of features of said electronic marker in said first image to determine the distance between said input device and said display screen to assess said z coordinate of said calibration position, wherein a second image of said electronic marker captured by said image sensor is used by a cross correlating component to calculate x, y and z coordinates of a relative position of said input device, wherein said position of said input device is tracked according to the following method:
displaying a first series of frames on screen display screen without displaying said electronic marker, wherein said first series of frames depict a view of a game from said calibration position;
capturing said second image;
comparing said second image with said first image;
calculating a first relative position of said input device comprising x, y and z coordinates; and
displaying a second series of frames on said monitor without displaying said electronic marker, wherein said second series of frames depict a view of said game from said first relative position.

13. The system of claim 12 wherein said image sensor is a navigation sensor.

14. The system of claim 12 wherein said navigation sensor is a flying mouse.

15. The system of claim 12 wherein said controller and said input device are connected by a wireless link.

16. The system of claim 12 wherein said controller and said input device are connected by a cord.

17. The system of claim 12 wherein said display screen is a cathode ray tube.

18. The system of claim 12 wherein said display screen is a computer screen.

19. The system of claim 12 wherein said display screen is a video arcade game monitor.

20. The system of claim 12 wherein said system is configured to display said electronic marker on said display screen for a fraction of a second so that said electronic marker is not user-detectable.

* * * * *